Figure 1:
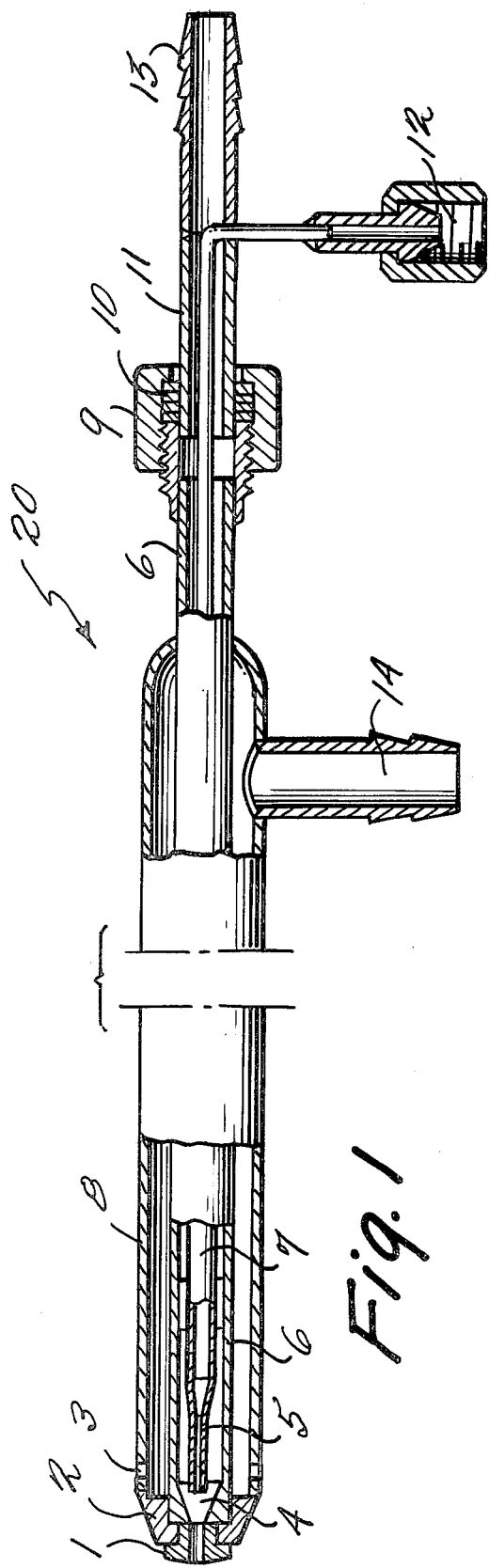

United States Patent [19]

Rothbühr et al.

[11] 4,195,068
[45] Mar. 25, 1980

[54] PROCESS FOR THE PRODUCTION OF FURNACE BLACK

[75] Inventors: Lothar Rothbühr, Hermülheim; Gehard Kühner; Gunther Dittrich, both of Hanau, all of Fed. Rep. of Germany

[73] Assignee: Deutsche Gold- und Silber-Scheideanstalt vormals Roessler, Frankfurt, Fed. Rep. of Germany

[21] Appl. No.: 973,716

[22] Filed: Dec. 27, 1978

Related U.S. Application Data

[63] Continuation of Ser. No. 555,084, Mar. 4, 1975, abandoned.

[30] Foreign Application Priority Data

Mar. 6, 1974 [DE] Fed. Rep. of Germany ....... 2410565

[51] Int. Cl.$^2$ ............................ C09C 1/48; C09C 1/50
[52] U.S. Cl. .................................... 423/455; 422/150; 423/450
[58] Field of Search ............... 423/450, 455, 456, 457; 422/150, 151, 156

[56] References Cited

U.S. PATENT DOCUMENTS

| | | | |
|---|---|---|---|
| 3,256,065 | 6/1966 | Latham | 422/150 |
| 3,501,274 | 3/1970 | Whittle et al. | 423/456 X |
| 3,701,480 | 10/1972 | Kühner et al. | 239/420 |

*Primary Examiner*—Edward J. Meros
*Attorney, Agent, or Firm*—Cushman, Darby & Cushman

[57] ABSTRACT

Carbon black low in coke and grit is produced at a higher hourly rate and higher yield per unit of oil employed in a furnace black reactor using a burner-injector combination for the production of heat energy and for the injection of very fine drops of carbon forming material (feed/stock) by a process which uses a reactor with a restriction mixing the liquid carbon black forming material supplied through an inner tube of the burner-injector combination with a gaseous atomizing medium supplied from a jacket tube surrounding this inner tube, the jacket tube being conically tapered before an exit nozzle, said mixing occurring just before the exit nozzle, the outermost fuel gas jacket being so provided with relatively few gas openings that the fuel gas pressure at the burner amounts to over 1.5 atmospheres absolute and the fuel gas exit speed is over 320 meters per second.

13 Claims, 3 Drawing Figures

BURNER-INJECTOR OF THE INVENTION

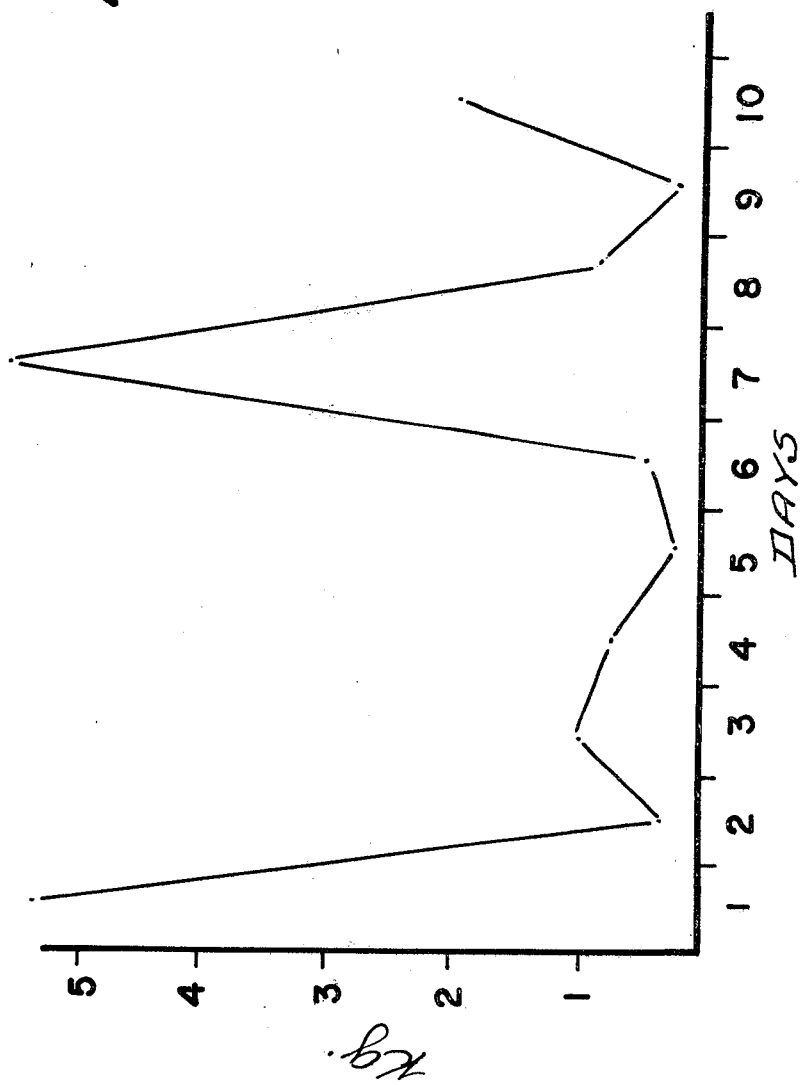

PROCESS FOR THE PRODUCTION OF FURNACE BLACK

This is a continuation, of application Ser. No. 555,084 filed Mar. 4, 1975, now abandoned.

The greatest part of the work production of carbon black is produced by the furnace black or oven black process. In principle a hot rotating mass of combustion gases is formed by burning mostly gaseous fuels in fire resistant lined reactors with tangential introduction of air. A liquid hydrocarbon of high aromatic composition is then sprayed for the most part axially, into this hot, rotating mass. Through the high temperature the hydrocarbons are decomposed into carbon (carbon black) and hydrogen. As simple as this basic principle is, as important are the details to be observed. There is first the place at which the hot mass of combustion gases is formed. Several known processes produce this combustion flue gases in a separate precombustion chamber. After complete expiration of the burning of the gas the liquid highly aromatic carbon black forming material is then sprayed in. To be sure it has been shown that it is advantageous for a series of types of carbon black that the place of production of the hot combustion gases and the spraying in of the liquid highly aromatic carbon black forming material be brought as close as possible to each other. The idea of the invention described below refers to a process in which this principle is used.

A further important measure in the furnace black process is the quick mixing of the carbon black forming material (feed stock) in the combustion gas. Various methods of operation are also known already for this purpose. The most effective prerequisite for a quick and intensive mixing consists of introducing a restriction in the internal reactor contour. An especially intensive mixing of all materials added takes place in this restriction. There has already been published processes which operate without a restriction, for example the process described in Jager German Offenlegungsschrift 1,910,125, the entire disclosure of which is hereby incorporated by reference and relied upon. The invention, however, relates to the production of oven blacks (furnace blacks) in reactors having a constriction. It relates in a narrower sense to the use of a burner-injector combination for continuous turbulent production of hot flue gas and to the spraying in at the adjacent place of highly aromatic liquid hydrocarbons (for short hereinafter called feed-stock) for the purpose of producing furnace black.

The shape of the essential reactor restriction of the invention is of little criticality. The advantages producible by the invention result both in right angle restrictions, conical restrictions laval shaped restrictions, venturi shaped restrictions as well as restrictions with other contours.

A quick intermixing of the liquid feed stock in the hot combustion gases besides can be guaranteed if the feed stock is fed into the reactor in the form of a spray of fine drops, in order that these drops vaporize in the quickest manner and are pyrolytically decomposed into carbon black and hydrogen. In order to attain this goal several processes are known in which the feed-stock is sprayed in with mono-nozzles into the hot combustion gases. However, high pressure is necessary for this and the drops produced are relatively large. A substantially finer atomization into uniform drops of small particle diameter on the contrary is attained by using a binary nozzling by means of an atomizing gas such as air, steam, etc.

Known styles of combined burner-injector apparatuses are described in Steele German Pat. No. 974,850 and Campbell German Auslegeschrift 1,020,139. They are characterized by a mixing apparatus for liquid feed stock and atomizing air outside the reactor and a long tube through which the mixture is introduced into the furnace chamber, (see Steele German Pat. No. 974,850 page 4, lines 35-37). There can be added to the feed stock or the gaseous atomizing agent for the feed stock an aqueous additive solution, e.g. a potassium chloride solution. Such additives serve to control the structure of the carbon black. The combined burner injector apparatuses mentioned above are further characterized by an outer gas jacket around the injector forming the burner part, from which the gas flows out from numerous holes at relatively low pressure. The out flowing can take place directly at the burner head or somewhat set back therefrom.

The described conventional burner injector combinations have a series of disadvantages. They favor the growth of coke at the burner heat, which falls off from time to time and contaminates the carbon black. In the insertion of aqueous additive solutions further growths are formed in the outlet openings for the feed stock-atomizing agent mixture. These growths consist of coke and limestone. Through the formation of these deposits the quality of the carbon black is changed, especially considerably in industrial operation so that at intervals of two to five days the plant is shut down and the burner-injector apparatus must be cleaned. Therefore there is a pressing need to provide a process for the production of carbon black low in coke and grit at a higher hourly rate and higher yield per unit of oil employed in furnace black reactors using a burner-injector combination for the production of heat energy and for injection of the finest drops of feed stock which overcomes the disadvantages of the known processes.

The process of the invention produces carbon black low in coke and grit at a higher hourly rate and higher yield per unit of oil employed in a furnace black reactor by using a burner-injector combination for the production of heat energy and for the injection of very fine drops of carbon forming material which process comprises using a reactor with a restriction, mixing the liquid feed stock supplied through an inner tube of the burner-injector combination with a gaseous atomizing medium supplied from a jacket tube surrounding this inner tube, the jacket tube being conically narrowed before an exit nozzle, said mixing occurring just before the exit tube nozzle, the outermost fuel gas jacket being so provided with relatively few gas openings that the fuel gas pressure at the burner amounts to over 1.5 atmospheres absolute and the fuel gas exit speed is over 320 meters per second.

The burner-injector combination used in the process of the invention is described in principle in the Jager German Offenlegungsschrift 1,910,125.

The fuel gas pressure at the burner can be as high as 15 atmospheres absolute and the fuel gas exit speed can be as high as 800 meters per second.

Through the low number of fuel gas openings, e.g. 4 to 12 openings, and the high accompanying pressure, a small number of coherent gas jets from the reactor axis with an extremely high speed penetrate deep into the combustion air which is sweeping past and mixes first directly in the vicinity of the reactor wall with the air.

The mixing in the vicinity of the reactor will on account of the temperature radiation from the reactor wall is optimal, so that an instanteous point-like combustion takes place in the smallest space.

A preferred form of the invention uses a burner-injector combination which has about 4 to 12 gas exit openings distributed over the 360°. The gas exit openings are suitably at an exit angle of 90° to the oil exit; in many cases there can also be provided exit angles deviating therefrom.

It has also been found favorable to arrange the gas exit openings in one or more planes preferably perpendicular to the axis of the burner-injector combination.

An essential condition of the invention consists of using an increased fuel gas pressure at the burner, which pressure always is above 1.5 atmospheres absolute. An especially effective carrying out of the processes provides that the number of gas exit openings and their size is so selected that at the amounts of fuel gas supplied there is present a fuel gas pressure between 2 and 6 atmospheres absolute.

These pressures correspond to an exit speed for the fuel gas of over 320 m/sec. which preferably is near the speed of sound of the fuel gas used at the exit temperature. The establishing of this fuel gas speed is a further effective condition of the invention.

It has further proven favorable to select a free diameter for the injector exit nozzle between 40 and 75%, preferably between 50 and 65% of the jacket tube into which there is led the gaseous atomizing medium.

It has further proven advantageous to allow the feed tube of the injector for the liquid feed stock end in the conical portion of the jacket tube and to select the distance of the injector orifice from the end of the exit nozzle to be 60 to 120% of the diameter of the jacket tube into which the gaseous atomizing medium is led.

The essential idea of the invention depends on the combination between the use of a furnace black reactor provided with a restriction that improves the feed stock atomization and the explained, special type of introducing of fuel gas. The restriction which can have any contour produces especially favorable effects if the cross-sectional area of the reactor passage is narrowed so that it is no more than one-third, preferably from one-fourth to one-tenth that of the cross-sectional area before the constriction.

The industrial advantages described later in more detail obtainable with the three main conditions of the combination of the invention described above compound to the known processes are considerable and above all also obtainable in large scale operation of the process. They consist in an increase of the carbon black output and yield based on oil employed at otherwise the same amount of air and gas addition. They further consist in a uniform, continuous production which need not be stopped for cleaning of the burner-injector and lead to less grit formation generally and to less coke deposits specially. Also the attainment of a narrower primary particle distribution is appraised as the most important industrial advantage.

Figure 2:
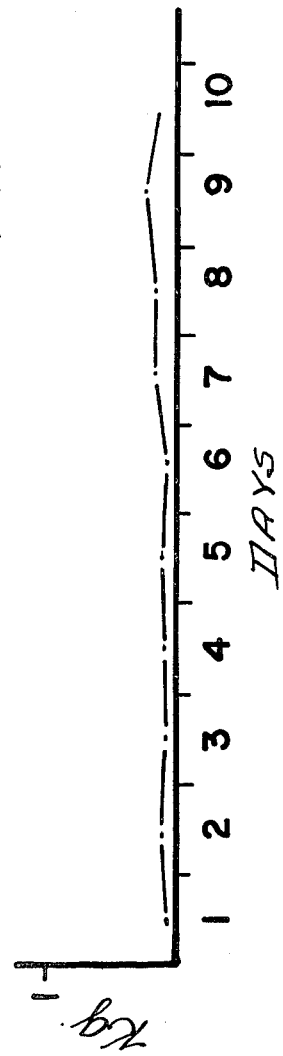

The process of the invention will be understood best in connection with the following drawings wherein FIG. 1 is a horizontal elevation partially broken away in section of the apparatus used;

FIG. 2 is a graphical representation of the amount of grit according to the invention; and FIG. 3 is a graphical representation of the amount of grit according to a conventional process.

The invention is explained in the following examples which, however, are non-limiting.

Unless otherwise indicated all parts and percentages are by weight.

Referring more specifically to the drawings, there is provided a burner-injector apparatus designated generally as 20 consisting essentially of a liquid or oil supplying tube (or pipe) 12 which has a constriction 5 at its mouth, which fixes the outlet velocity of the liquid. This oil supply tube 12 enters in the back part of the apparatus in the jacket tube having the wall 11/6. The jacket tube is provided for supplying the gas. The oil supply tube runs centrally in the middle axis of the jacket tube in the direction of the cylindrical bore of the nozzle 1. The tube 12 is firmly connected to the tube 11 which forms the backward continuation of tube 6 and is movable in the direction of the burner axis with the help of nut 9 and the spacer ring 10.

The atomizing gas enters through the connecting piece 13 into the jacket tube 11/6 and reaches the space between this jacket tube and the oil supply tube in the forward part 4 in which the gas undergoes an acceleration. In the region of this constriction according to the drawing the liquid feedstock goes out of the oil tube 5 constriction and becomes dispersed in the accelerated gas stream in order to finally go out of the nozzle 1 as a homogeneous atomized mixutre with a higher velocity. In place of nozzle 1 there can be employed other shaped nozzles, e.g. venturi or laval nozzles.

In the illustrative form of the apparatus used in the invention the jacket tube 6 is surrounded by an outer jacket tube 8 for the supplying of the fuel gases. The fuel gas enters the apparatus at 14 and leaves through the radially arranged bores 3.

The advantage of the illustrative form of the invention is also in that the mixture of oil and atomizing agent is first produced shortly before the exit nozzle, without the oil drops touching the hot nozzle orifice and without the formation of coke deposition.

In contrast thereto with customary burner-injector combinations the mixture of oil and atomizing agent takes place outside the reactor at about position 13 and the oil-air mixing spreads along the wall so that growths take place in the exit nozzle.

EXAMPLE 1

This example relates to the production of a finely divided furnace black for insertion in polyethylene mixutres and rubber mixtures. It is characterized by the following characteristic data:

| | |
|---|---|
| Iodine adsorption according to ASTM D 1510/60 | 150 mg/g |
| Average primary particle size (determined electron-microscopically) | about 18nm (mµ) |
| Ashing residue (DIN 53586) | 0.15% |
| pH value (DIN 53200) | 9.8 |

DIN is the abbreviation for German Industrial Standard.

The carbon black is produced in a reactor with rectangular restriction in which the cross-section in the narrow place is narrowed to 25% of the starting cross section before restriction.

Below are given the specific data of the starting materials:

| (1) Feedstock (oil) | | |
| --- | --- | --- |
| Density 20° C. | kg/l | 1.085 |
| Beginning of boiling | °C. | 268 |
| Boiling curve | Vol. % | °C. |
|  | 5 | 291 |
|  | 10 | 304 |
|  | 20 | 319 |
|  | 30 | 328 |
|  | 40 | 334 |
|  | 50 | 341 |
|  | 60 | 348 |
|  | 70 | 356 |
|  | 80 | 367 |
|  | 90 | 394 |
|  | 98 | 400 |
| Distillation residue in grams per 100 ml | | 3.2 |
| Sodium content | ppm | 0.5 |
| Potassium content | ppm | 0.04 |
| Bureau of Mines Correlation Index | | 138 |
| (2) Fuel gas | | |
| Heating value | | |
| $H_o$ | Kcal/Nm³ | 9.494 |
| $H_u$ | Kcal/Nm³ | 8.517 |
| Heavy hydrocarbons | Vol. % | 2.2 |
| Oxygen | Vol. % | 0.0 |
| Carbon monoxide | Vol. % | 0.4 |
| Hydrogen | Vol. % | 3.6 |
| Methane | Vol. % | 93.8 |

Carbon black with the specifications set forth previously in this example was produced in the same reactor using (1) a conventional burner-injector and (2) according to the present process.

|  |  | Conventional Process | Process of the Invention |
| --- | --- | --- | --- |
| Mixing of oil and atomizing air |  | 700 mm behind the discharge nozzle | (10–20mm) directly before the discharge nozzle |
| Exit nozzle for oil-air diameter | mm | 15 | 15 |
| Fuel gas outlets 3.5mm diameter | number | 12 | 6 |
| Gas pressure before fuel gas discharge | atmosphere absolute | 1.0 | 2.4 |
| Amount of gas | Nm³/h | 110 | 110 |
| Gas exit speed | m/sec. | 260 | 530 |
| Amount of combustion air | Nm³/h | 2,100 | 2,100 |
| Temperature of combustion air | °C. | 470 | 500 |
| Amount of compressed air | Nm³/h | 150 | 150 |
| Amount of oil added | kg/h | 544.1 | 664.8 |
| Amount of carbon black produced | kg/h | 230.1 | 325.1 |
| Yield based on the oil | % | 42.3 | 48.5 |
| Iodine adsorption of the carbon black produced | mg/g | 149.9 | 150.3 |
| Ashing residue | % | 0.18 | 0.13 |

|  | Conventional Process | Process of the Invention |
| --- | --- | --- |
| pH value | 9.5 | 9.7 |

It is easy to see that by using the process of the invention at equal amounts of gas and air and using the same type of reactor substantially more oil can be added and considerable more carbon black produced. Also the yield based on the oil is improved considerable. This is traced back to the good atomization and the point-like addition of fuel gas.

EXAMPLE 2

The carbon blacks produced in Example 1 were examined electronmicroscopically and the primary particle sizes of the carbon blacks distributed by counting out in groups of 5 nm size, i.e. the classification frequency of each particle size determined in steps of 5 nm. Thereby the following results were obtained:

|  | Classification Frequency in % | |
| --- | --- | --- |
|  | Furnace Black according to Example 1 Conventional Process | Furnace Black according to Example 1, Process of the Invention |
| 0–5nm | 2.0 | — |
| 5–10nm | 12.0 | 8.0 |
| 10–15nm | 26.0 | 30.0 |
| 15–20nm | 25.0 | 35.0 |
| 20–25nm | 17.0 | 16.5 |
| 25–30nm | 9.0 | 7.5 |
| 30–35nm | 5.0 | 2.5 |
| 35–40nm | 2.0 | 0.5 |
| 40–45nm | 1.0 | — |
| 45–50nm | 0.5 | — |

It can be seen that the carbon black produced according to the invention has a more uniform primary particle size. This can be seen in that several classifications are not contained in the carbon produced according to the invention. While the two most frequent classifications (10–20 nm) with customarily produced carbon black combined total only 51%, they are 65% in the method of operating according to invention. A uniform primary particle size is strived for for the areas of use of the mentioned carbon black. Also in this regard a truer advance is recognized.

EXAMPLE 3

As is already mentioned in Example 1, there are also produced furnace blacks according to the process of the invention which can be used, among other uses, for the production of black polyethylene films. In order not to harm the processing machinery and to produce unobjectionable films the content of foreign constituents (also designated as grit) must be very small. The specifications call for, in part, grit contents of below 0.005–0.01%. By the term grit in the carbon black industry always means the parts which in a wet sieving according to DIN 53380 remain behind on the 0.043 nm (43 μm) sieve and are not distributable. With suitable visual apparatus indicators it is of course possible to remove a considerable part of the grit from the carbon black. However, it is difficult to separate the extremely fine grit constituent (microgrit) from the residue.

There is compared below for a fixed interval of time the customary method and the method of the invention. The grit portion extracted from a grit separator thereby was examined as a measure of the effectiveness of the burner-injector used.

There were used the same reactor type, burner-injector and amounts as in Example 1. There was produced the same type of carbon black:

|  |  | Customary Process | Process of the Invention |
|---|---|---|---|
| Mixing of Oil and Atomizing air |  | For before the discharge nozzle (about 700mm) | Directly before the discharge nozzle (10-20mm) (see FIG. 1) |
| Fuel gas outlets 3.5 mm in diameter | number | 12 | 6 |
| Gas pressure before the fuel gas outlet |  | 1.0 | 2.4 |
| Gas exit speed (m/sec) |  | 260 | 530 |
| Grit discharge in kg/day | 1 day | 550 | 0.02 |
|  | 2 days | 0.30 burner change | 0.06 |
|  | 3 days | 1.40 | 0.03 |
|  | 4 days | 0.75 | 0.04 |
|  | 5 days | 0.25 | 0.05 |
|  | 6 days | 0.50 burner change | 0.03 |
|  | 7 days | 5.60 | 0.15 |
|  | 8 days | 1.00 | 0.15 |
|  | 9 days | 0.30 burner change | 0.20 |
|  | 10 days | 2.25 | 0.06 |

Two advantages can be clearly recognized. While the customary burner-injector had to be changed every 3-6 days for cleaning, this is not the case in the process of the invention. A cleaning is necessary, if at all only after 4-8 weeks.

Besides in the process of the invention there are only 1/20th the impurities (grit) obtained in the customary process. A graphic representation of the values measured in Example 2 are given in FIG. 2 for the process of the invention and in FIG. 3 for the customary process.

The process can comprise, consist of or consist essentially of the steps set forth.

What is claimed is:

1. In a process for the production of carbon black low in coke and grit at a high hourly rate and high yield per unit of liquid feedstock employed to form the carbon black in a furnace black reactor including a burner-injector combination for the production of heat energy and for the injection of very fine drops of carbon black forming liquid, the improvement comprising employing as said reactor one having restriction therein, said burner-injector comprising an inner tube as said injector and a first jacket tube surrounding said inner tube, an exit nozzle, said jacket tube being constricted prior to said exit nozzle, said restriction being such that the cross-sectional area of the reactor passage is narrowed to no more than one-third the cross-sectional area before the restriction, and an outer tube surrounding said first jacket tube, said outer jacket tube being provided with 4 to 12 gas outlets distributed over 360°, the free diameter of the inner tube exist being between 40 and 75% of the free diameter of the first jacket tube, supplying liquid carbon black forming material through said inner tube, supplying a gaseous atomizing medium through said first jacket tube, mixing said liquid carbon black forming material with said gaseous atomizing medium immediately prior to said exit nozzle and in the area of restriction and supplying fuel gas through said gas outlet openings at an exit pressure of over 1.5 atmospheres absolute and a fuel gas exit speed of over 320 meters/sec.

2. The process of claim 1 wherein said first jacket tube is conically tapered before said exit nozzle to provide said constriction said process comprising mixing the liquid carbon black supplying material with the atomizing medium in said conically tapered portion of the first jacket tube.

3. The process according to claim 1 wherein the gas outlet openings are arranged in at least one plane perpendicular to the axis of the burner-injector and the process comprises supplying the fuel gas through said openings.

4. The process of claim 2 wherein the number of fuel gas openings and their size is such that the fuel gas is supplied at a fuel gas pressure of 2 to 6 atmospheres absolute.

5. The process of claim 2 wherein the free diameter of the inner tube exit is between 50 and 65% of the free diameter of the first jacket tube.

6. The process of claim 2 wherein said inner tube terminates in the conical part of the first jacket tube and the distance of the orifice of the inner tube from the end of the exit nozzle is 60 to 120% of the diameter of said first jacket tube.

7. The process of claim 1 wherein the restriction of the cross-sectional reactor-area is to form one-fourth to one-tenth that of the cross-sectional area before the restriction.

8. The process of claim 7 wherein the fuel gas exit speed is about the velocity of sound.

9. The process of claim 1 wherein the restriction is such that the cross sectional area of the reactor passage is narrowed from one-third to one-tenth that of the cross-sectional area before the restriction to increase the speed of the fuel gas passing through the opening.

10. The process of claim 2 wherein the inner tube is constricted at its orifice and the speed of the carbon black forming liquid feedstock is thereby increased as it goes through the restriction of the reactor.

11. The process of claim 1 wherein the inner tube is constricted at its orifice and the speed of the carbon black forming liquid is thereby increased as it goes through the restriction of the reactor.

12. The process of claim 1 wherein the liquid carbon black forming material and the gaseous atomizing medium are mixed 10-20 mm. before the exit nozzle.

13. The process of claim 1 wherein the restriction in the reactor is rectangular and the cross-sectional area of the reactor passage is narrowed to 25% of the cross-sectional area before the restriction.

* * * * *